United States Patent
Wei et al.

(10) Patent No.: US 12,374,268 B2
(45) Date of Patent: Jul. 29, 2025

(54) PANEL DISPLAY METHOD, APPARATUS AND SYSTEM, DEVICE AND STORAGE MEDIUM

(71) Applicants: Beijing BOE Display Technology Co., Ltd., Beijing (CN); BOE Technology Group Co., Ltd., Beijing (CN)

(72) Inventors: Chongguang Wei, Beijing (CN); Weifan Yang, Beijing (CN); Lei Liu, Beijing (CN); Jinnan Lin, Beijing (CN); Xiaofeng Yin, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/272,571

(22) PCT Filed: Sep. 30, 2022

(86) PCT No.: PCT/CN2022/123275
§ 371 (c)(1),
(2) Date: Jul. 15, 2023

(87) PCT Pub. No.: WO2024/065678
PCT Pub. Date: Apr. 4, 2024

(65) Prior Publication Data
US 2025/0037640 A1    Jan. 30, 2025

(51) Int. Cl.
G09G 3/30    (2006.01)
(52) U.S. Cl.
CPC ............ *G09G 3/30* (2013.01); *G09G 2310/08* (2013.01); *G09G 2330/021* (2013.01); *G09G 2340/0435* (2013.01)

(58) Field of Classification Search
CPC ................ G09G 3/30; G09G 2310/08; G09G 2330/021; G09G 2340/0435
See application file for complete search history.

(56) References Cited

U.S. PATENT DOCUMENTS

| | | | |
|---|---|---|---|
| 2010/0001985 A1* | 1/2010 | Chen | G09G 3/3677 345/92 |
| 2018/0166023 A1* | 6/2018 | Tomizawa | H04N 25/445 |

(Continued)

FOREIGN PATENT DOCUMENTS

| | | |
|---|---|---|
| CN | 103915076 A | 7/2014 |
| CN | 108648713 A | 10/2018 |

OTHER PUBLICATIONS

PCT/CN2022/123275 international search report.
PCT/CN2022/123275 Written Opinion.

*Primary Examiner* — Towfiq Elahi
(74) *Attorney, Agent, or Firm* — IPro, PLLC

(57) ABSTRACT

The present disclosure provides a panel display method, apparatus and system, a device and a storage medium. The method includes: when determining that a refresh rate configuration of a panel is W*N, determining M/N real-pixel rows for the panel, where N−1 pixel rows are presented between adjacent real-pixel rows of the real-pixel rows; where the panel comprises M pixel rows, and a resolution of the panel is M*Z; N≥2; acquiring image stream data with a refresh rate of W*N and M/N rows of pixel values; where an image resolution of the image stream data is (M/N)*Z; adjusting a start moment and a period of an input latch signal of the panel, so that the M/N real-pixel rows display the M/N rows of pixel values in the image stream data row by row, where a theoretical charging duration of a single real-pixel row is greater than or equal to 1/(W*M) second.

12 Claims, 6 Drawing Sheets

(56) References Cited

U.S. PATENT DOCUMENTS

2019/0103072 A1\* 4/2019 Li ............................ G09G 3/36
2020/0098326 A1\* 3/2020 Zhang .................. G09G 3/3266

\* cited by examiner

PANEL DISPLAY METHOD, APPARATUS AND SYSTEM, DEVICE AND STORAGE MEDIUM

CROSS-REFERENCE TO RELATED APPLICATIONS

This application is a national stage of international PCT Application No. PCT/CN2022/123275 filed on Sep. 30, 2022, the entire contents of which are incorporated herein by reference.

TECHNICAL FIELD

The present disclosure relates to the field of display technology, and in particular to a panel display method, an apparatus, a system, a device and a storage medium.

BACKGROUND

When a panel displays image data, a refresh rate of the panel is expected to be improved, so as to improve the display effect of the panel.

However, when the refresh rate of the panel is high, a theoretical charging duration of a single pixel row will usually be shortened, which may lead to insufficient actual charging duration of the single pixel row, thus a single row of pixel values cannot be fully displayed, and the display effect of the panel will be reduced.

SUMMARY

The present disclosure provides a panel display method, an apparatus, a system, a device and a storage medium, to solve deficiencies in related arts.

According to a first aspect of the present disclosure, a panel display method is provided, including:
  when determining that a refresh rate configuration of a panel is W*N, determining M/N real-pixel rows for the panel, where N−1 pixel rows are presented between adjacent real-pixel rows of the determined M/N real-pixel rows: where the panel includes M pixel rows, and a resolution of the panel is M*Z: N≥2;
  acquiring image stream data with a refresh rate of W*N and M/N rows of pixel values: where an image resolution of the image stream data is (M/N)*Z; and
  adjusting a start moment and a period of an input latch signal of the panel, so that the determined M/N real-pixel rows display the M/N rows of pixel values in the image stream data row by row, where a theoretical charging duration of a single real-pixel row is greater than or equal to 1/(W*M) second.

Optionally, determining that the refresh rate configuration of the panel is W*N including any one of:
  determining that the refresh rate configuration of the panel needs to be updated as W*N; and
  determining that the refresh rate configuration of the panel needs to be set as W*N;
  determining that the refresh rate configuration of the panel needs to be increased from W to W*N.

Optionally, the method further includes:
  for a mixed-pixel row between a pair of adjacent real-pixel rows of the panel, acquiring a single row of mixed-pixel values based on two rows of pixel values displayed in the pair of adjacent real-pixel rows, so that the mixed-pixel row displays the acquired single row of mixed-pixel values.

Optionally, acquiring the image stream data with the refresh rate of W*N and the M/N rows of pixel values includes:
  acquiring the image stream data with the refresh rate of W*N and the M/N rows of pixel values output by a resolution adjuster;
  the resolution adjuster is configured to acquire initial image stream data with a refresh rate of W*N output by a graphics card, adjust an image resolution of the initial image stream data to (M/N)*Z, and output an adjusted result.

Optionally, the image resolution of the initial image stream data is smaller than or equal to (M/N)*Z.

Optionally, when determining that the refresh rate configuration of the panel is W*N, the method further includes:
  when determining that the refresh rate needs to be increased to W*N, performing power-down restarting for the panel and the resolution adjuster, to update the refresh rate configuration of the panel to W*N, update an output of the resolution adjuster to the image stream data with the refresh rate of W*N and the M/N rows of pixel values; and update an output of the graphics card to the image stream data with the refresh rate of W*N.

According to a second aspect of the present disclosure, a panel display apparatus is provided, including:
  a real module, configured to, when determining that a refresh rate configuration of a panel is W*N, determine M/N real-pixel rows for the panel, where N−1 pixel rows are presented between adjacent real-pixel rows of the determined M/N real-pixel rows: where the panel includes M pixel rows, and a resolution of the panel is M*Z: N≥2;
  an acquiring module, configured to acquire image stream data with a refresh rate of W*N and M/N rows of pixel values: where an image resolution of the image stream data is (M/N)*Z; and
  an adjusting module, configured to adjust a start moment and a period of an input latch signal of the panel, so that the determined M/N real-pixel rows display the M/N rows of pixel values in the image stream data row by row, where a theoretical charging duration of a single real-pixel row is greater than or equal to 1/(W*M) second.

Optionally, determining the refresh rate configuration of the panel is W*N including any one of:
  determining that the refresh rate configuration of the panel needs to be updated as W*N;
  determining that the refresh rate configuration of the panel needs to be set as W*N;
  determining that the refresh rate configuration of the panel needs to be increased from W to W*N.

Optionally, the adjusting module is further configured to:
  for any mixed-pixel row between any pair of adjacent real-pixel rows on the panel, acquiring a single row of mixed-pixel values based on two rows of pixel values displayed in the pair of adjacent real-pixel rows, so that the mixed-pixel row displays the acquired single row of mixed-pixel values.

Optionally, the acquiring module is configured to:
  acquiring the image stream data with the refresh rate of W*N and the M/N rows of pixel values output by a resolution adjuster;
  the resolution adjuster is configured to acquire initial image stream data with a refresh rate of W*N output by a graphics card, and adjust an image resolution of the initial image stream data to (M/N)*Z, and output an adjusted result.

Optionally, the image resolution of the initial image stream data is smaller than or equal to (M/N)*Z.

Optionally, the real module is further configured to:
when determining that the refresh rate needs to be increased to W*N, performing power-down restarting for the panel and the resolution adjuster, to update the refresh rate configuration of the panel to W*N, update an output of the resolution adjuster to the image stream data with the refresh rate of W*N and the M/N rows of pixel values; and update an output of the graphics card to the image stream data with the refresh rate of W*N.

According to a third aspect of the present disclosure, a panel display system is provided, including: a panel and a resolution adjuster: where
the panel is configured to: when determining that a refresh rate configuration of the panel is W*N, determine M/N real-pixel rows for the panel, where N−1 pixel rows are presented between adjacent real-pixel rows of the determined M/N real-pixel rows: where the panel includes M pixel rows, and a resolution of the panel is M*Z: N≥2;
acquire image stream data with a refresh rate of W*N and M/N rows of pixel values output by the resolution adjuster: where an image resolution of the image stream data is (M/N)*Z; and
adjust a start moment and a period of an input latch signal of the panel, so that the determined M/N real-pixel rows display the M/N rows of pixel values in the image stream data row by row, where a theoretical charging duration of a single real-pixel row is greater than or equal to 1/(W*M) second;
the resolution adjuster is configured to acquire initial image stream data with a refresh rate of W*N output by a graphics card, adjust an image resolution of the initial image stream data to (M/N)*Z, and output an adjusted result.

Optionally, the resolution adjuster is configured to: when determining that the refresh rate configuration of the panel is W*N, perform power-down restarting for the resolution adjuster, to update an output of the resolution adjuster to the image stream data with the refresh rate of W*N and the M/N rows of pixel values; and update an output of the graphics card to the image stream data with the refresh rate of W*N; and
the panel is configured to: when determining that the refresh rate configuration of the panel is W*N, perform power-down restarting for the panel, to update the refresh rate configuration of the panel to W*N.

Optionally, the system further includes: a graphics card:
the graphics card is configured to output the initial image stream data with the refresh rate of W*N: where the image resolution of the initial image stream data is smaller than or equal to (M/N)*Z.

As can be known from the above embodiments, by adjusting a start moment and a period of the input latch signal, a theoretical charging duration of a single pixel row of a high-resolution panel can be increased, and the display effect of the panel can be improved.

It is to be understood that both the foregoing general description and the following detailed description are exemplary and illustrative only and do not intend to restrict the present disclosure.

BRIEF DESCRIPTION OF DRAWINGS

The accompanying drawings are incorporated into and constitute a part of this specification, and the accompanying drawings illustrate embodiments consistent with the present disclosure, and together with the description serve to describe the principles of the present disclosure.

DETAILED DESCRIPTION

Figure 1:
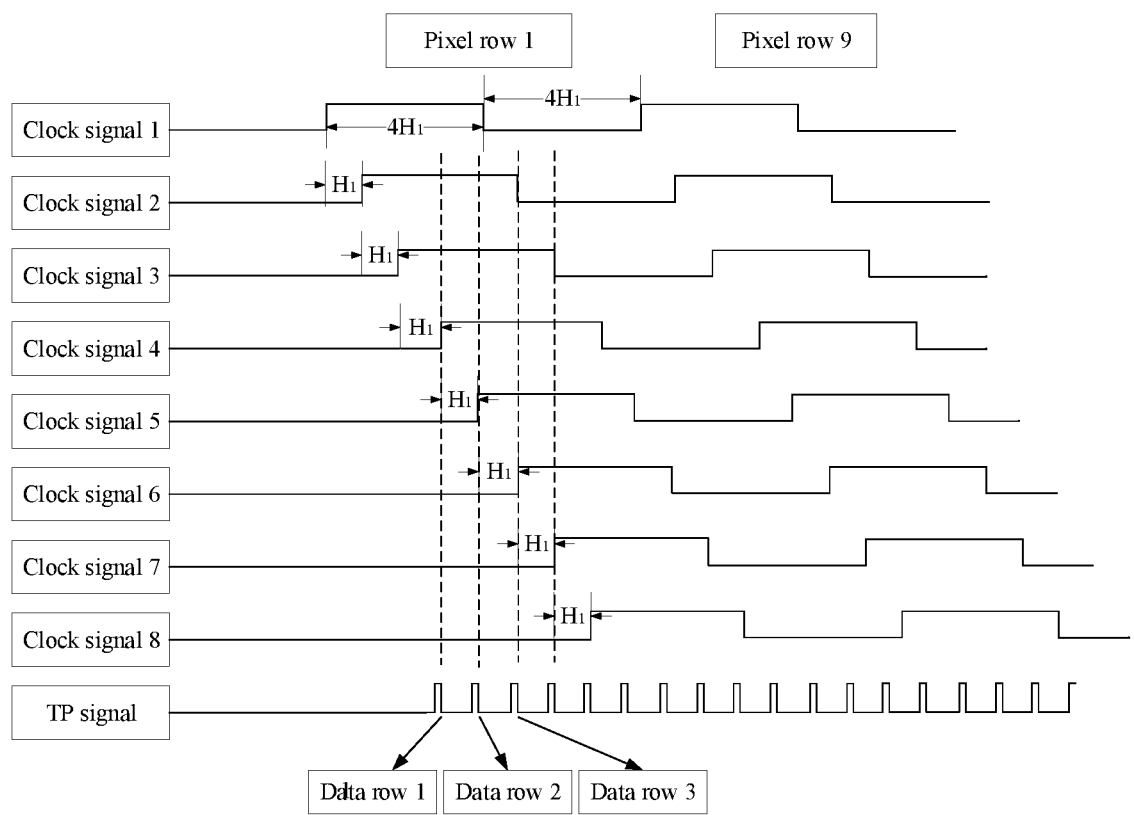
FIG. 1 shows a schematic principle diagram of a signal timing sequence of a panel according to an embodiment of the present disclosure.

Description will now be made in detail to illustrative embodiments, examples of which are shown in the accompanying drawings. When the following description refers to the drawings, unless otherwise indicated, the same numbers in different drawings indicate the same or similar elements. Embodiments described in the following illustrative embodiments do not represent all embodiments consistent with the present disclosure. In contrary, they are merely examples of apparatuses and methods consistent with some aspects of the present disclosure as described in detail in the appended claims.

When image data is displayed by a panel, refresh rate of the panel is expected to be improved, so as to improve the display effect of the panel.

However, when the refresh rate of the panel is high, a theoretical charging duration of a single pixel row will usually be shortened, which may lead to insufficient actual charging duration of the single pixel row, thus the single row of pixel values cannot be fully displayed, and the display effect of the panel will be reduced.

To solve the above problems, embodiments of the present disclosure provide a panel display method.

First, a theoretical charging duration of a single pixel row in a panel is analysed.

The refresh rate of the panel usually represents quantity of images need to be displayed within a second. For an image, the panel usually needs to scan the image row by row to display the image.

Thus, the theoretical charging duration of the single pixel row of the panel can be calculated according to a number of pixel rows and the refresh rate of the panel.

Specifically, in a panel with a refresh rate of W and M pixel rows, the theoretical charging duration of the single pixel row can be 1/(W*M) second.

Based on the theoretical charging duration of the single pixel row, the single pixel row can be charged, and the single row of pixel values in the image can be displayed. Specifically, the single row of pixel values in a corresponding image can be sent to the pixel row of the panel for displaying.

For example, for a k-th pixel row in a panel with M pixel rows, a k-th row of pixel values in an image with M rows of pixel values can be displayed.

Further, three signals are needed for charging and displaying the single pixel row in the panel, which are a clock signal, an input latch signal (may be also referred to as TP signal) and a data signal, respectively.

The single pixel row can be charged when a corresponding clock signal is in a high-electric-level period.

Further, when an input latch signal is at a low-electric-level after a falling edge, a data signal can be initiated to allow the single row of pixel values in the image data to be written into the single pixel row, of which the corresponding clock signal is currently in the high-electric-level period.

The clock signal has periods, and two adjacent periods of one clock signal may correspond to different pixel rows of the panel.

For example, for 800 pixel rows of the panel, in a process of displaying an image on the panel, for each of 8 clock signals, the clock signal may correspond to 100 pixel rows in the panel through 100 periods.

Specifically, a 1st period of a 1st clock signal may correspond to a 1st pixel row of the panel: a 1st period of a 2nd clock signal may correspond to a 2nd pixel row of the panel: a 1st period of a 3rd clock signal may correspond to a 3rd pixel row of the panel; . . . ; a 2nd period of the 1st clock signal may correspond to a 9th pixel row of the panel; and so on.

The input latch signal has periods. Along falling edges of the timing sequence, rows of pixel values in the image data can be written into initiated data signals row by row.

For example, for a low-electric-level after a first falling edge of the input latch signal, a first row of pixel values in the image data can be written into the initiated data signal. For a low-electric-level after a second falling edge of the input latch signal, a second row of pixel values in the image data can be written into the initiated data signal.

Therefore, in the panel, through the clock signal and the input latch signal, the image data can be written into the pixel rows of the panel row by row.

It is to be noted that when the corresponding clock signal of the single pixel row is in the high-electric-level period, a plurality of falling edges of the input latch signal may appear, so multiple rows of pixel values in the image data may be written into the single pixel row.

For the single pixel row of the panel, written multiple rows of pixel values will usually be covered by a last-written single row of pixel values, so that the last-written single row of pixel values will be displayed.

Thus, a theoretical charging duration of the single pixel row of the panel may be within the high-electric-level period of the corresponding clock signal, starting from a last falling edge of an input latch signal, and ending at a falling edge of the corresponding clock signal.

By configuring a start moment and a period of the input latch signal in the panel, the theoretical charging duration of each of the pixel rows of the panel is controlled to be within 1/(the refresh rate of the panel*the number of pixel rows of the panel) second, so as to display the image data row by row.

To facilitate understanding, as shown in FIG. 1, FIG. 1 shows a schematic principle diagram of a signal timing sequence of a panel according to an embodiment of the present disclosure.

The panel includes 8 clock signal generator therein, so as to generate 8 clock signals.

A 1st period of a clock signal 1 may correspond to pixel row 1 of the panel: a 1st period of a clock signal 2 may correspond to pixel row 2 of the panel: a 1st period of a clock signal 3 may correspond to pixel row 3 of the panel; . . . ; a 2nd period of the clock signal 1 may correspond to pixel row 9 of the panel; and so on.

Since 8 clock signals are presented, a period of each of the clock signals is 8 times of a theoretical charging duration of a signal pixel row, that is, 8H1. Each period includes 4H1 of a high-electric-level and 4H1 of a low-electric-level.

H1=1/(W*M) second. W represents a current refresh rate W of the panel, and M represents a total number of pixel rows of the panel. H1 represents a current theoretical charging duration of a single pixel row of the panel.

Among the 8 clock signals, start moments may have a difference of H1, as shown in FIG. 1.

For the pixel row 1, within the first period of the corresponding clock signal 1, from a last falling edge of an input latch signal (TP signal) to a falling edge of the clock signal 1, a duration thereof is H1. Hence, a data row 1 can be written into the pixel row 1, and the theoretical charging duration is H1.

For the pixel row 2, within the first period of the corresponding clock signal 2, two falling edges of the TP signal are presented therein. Hence, for the pixel row 2, the data row 1 is written first and then a data row 2 is written to cover the previously-written data row 1, so as to display the data row 2 at last.

From a last falling edge of an input latch signal (TP signal) to a falling edge of the clock signal 2, a duration thereof is H1. Hence, the data row 2 can be written into the pixel row 2, and the theoretical charging duration is H1.

And so on.

Further, through analysis, it is found that when the panel refresh rate is increased, the theoretical charging duration of the single pixel row will be correspondingly shortened.

For example, H1=1/(W*M) second. W represents a current refresh rate W of the panel, and M represents a total number of pixel rows of the panel. H1 represents a theoretical charging duration of a single pixel row of the panel with the refresh rate of W. When the refresh rate of the panel is increased to 2 W, the theoretical charging duration of the single pixel row of the panel is 0.5H1.

In other words, with the increase of the refresh rate of the panel, the theoretical charging duration of single pixel row in the panel will be shortened, which may lead to an insufficient charging duration of the single pixel row and a poor display effect.

Further, since a theoretical charging duration of the single pixel row of the panel may be within the high-electric-level period of the corresponding clock signal, starting from a last falling edge of an input latch signal, and ending at a falling edge of the corresponding clock signal.

Therefore, in the method, by adjusting a start moment and a period of the input latch signal of the panel, a theoretical charging duration of a single pixel row of the panel can be increased.

For example, H1=1/(W*M) second. W represents a current refresh rate W of the panel, and M represents a total number of pixel rows of the panel. H1 represents a theoretical charging duration of a single pixel row of the panel with the refresh rate of W. When the refresh rate of the panel is increased to 2 W, by adjusting the start moment and the period of the input latch signal of the panel, the theoretical charging duration of the single pixel row of the panel can still be maintained as H1.

Figure 2:
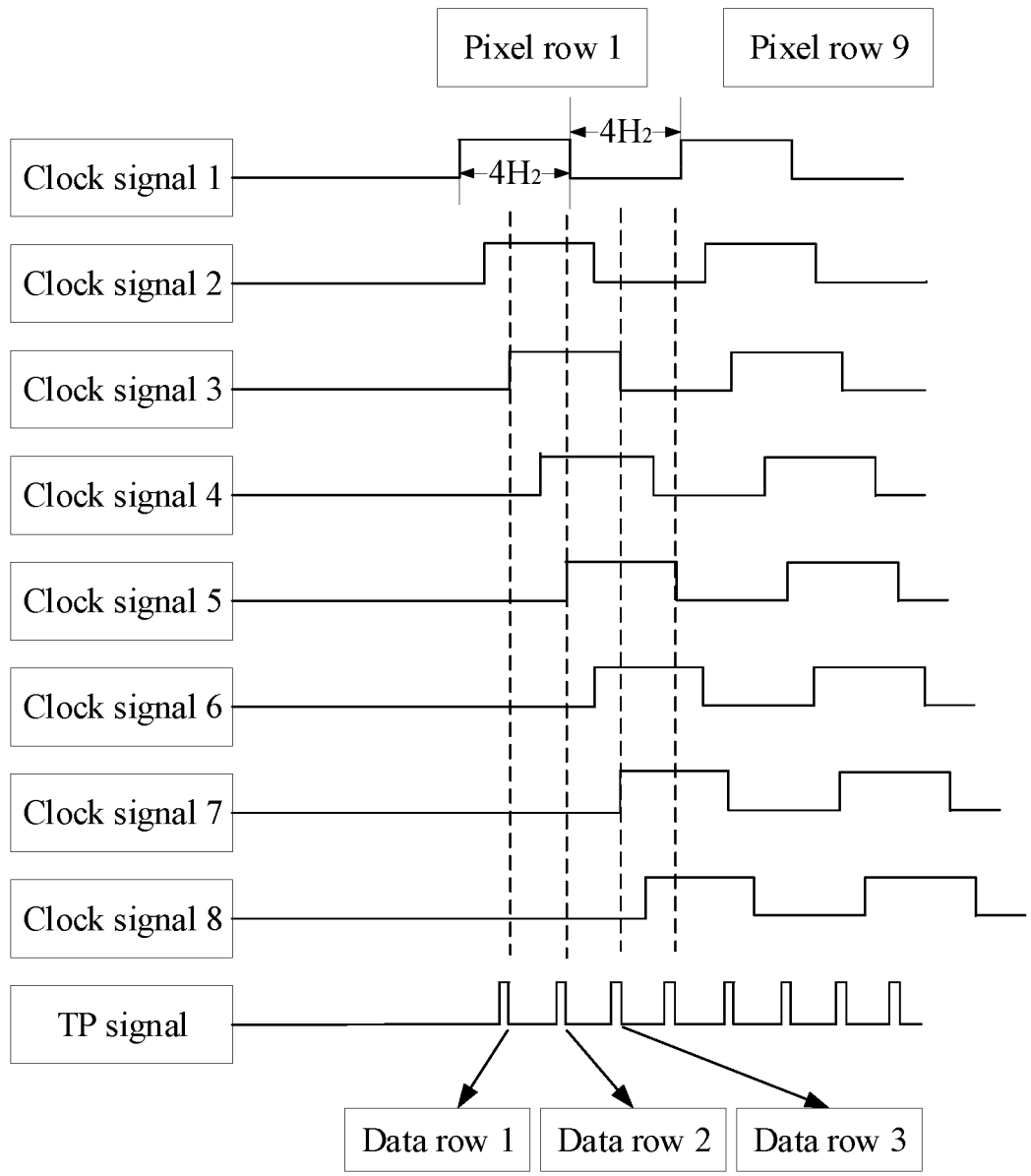
FIG. 2 shows a schematic principle diagram of another signal timing sequence of a panel according to an embodiment of the present disclosure.

To facilitate understanding, as shown in FIG. 2, FIG. 2 shows a schematic principle diagram of another signal timing sequence of a panel according to an embodiment of the present disclosure.

The refresh rate of the panel is increased from W to 2 W. Thus, a theoretical charging duration of a single pixel row in a regular case is 0.5H1, which is referred to as H2 for ease of description, so it is determined that H2-0.5H1.

The period of the clock signal changes to 8 times of the theoretical charging duration of the signal pixel row, which is specifically 8H2.

To maintain the theoretical charging duration of the single pixel row of the panel still as H1, the start moment and the period of the input latch signal of the panel can be adjusted.

For the period of the corresponding clock signal of the single pixel row, the last falling edge of the input latch signal can be adjusted, so that during the high-electric-level, the duration starting from the falling edge of the input latch signal and ending at the falling edge of the period of the corresponding clock signal is 2H2, that is, H1. Specifically, it is shown in FIG. 2.

For a first period of a clock signal 1 corresponding to a pixel row 1, a first falling edge of a TP signal can be adjusted to be at the middle of a high-electric-level period, so that during the high electric-level, the duration starting from the falling edge of the input latch signal and ending at the falling edge of the period of the corresponding clock signal is 2H2, that is, H1.

In other words, by adjusting the start moment and the period of the input latch signal of the panel, the theoretical charging duration of the single pixel row of the panel can still be maintained as 2H2, that is, H1.

In addition, it should be noted that since the method does not improve the timing sequence of the clock signal, for the first period of the clock signal 1 corresponding to the pixel row 1, when the first falling edge of the TP signal is adjusted to be at middle of the high-electric-level period, it is necessary to ensure that the first falling edge of the TP signal is the last falling edge of the TP signal during the high-electric-level period of the first period of the clock signal 1.

Due to distances between start moments of the clock signals, the falling edge of the first period of the clock signal 1 corresponds to a position of 3H2 of the high-electric-level period of the first period of the clock signal 2. Thus, to ensure that the first falling edge of the TP signal is the last falling edge of the TP signal during the high-electric-level period of the first period of the clock signal 1, a second falling edge of the TP signal needs to be behind 3H2 of the high-electric-level period of the first period of the clock signal 2.

Thus, for a pixel row 2 corresponds to the first period of the clock signal 2, due to adjustments on the start moment and the period of the TP signal, manners in FIG. 1 cannot be adopted to make the pixel row 2 only correspond to a data row 2.

The first falling edge of the TP signal corresponds to a position of H2 of the high-electric-level period of the first period of the clock signal 2, thus the data row 1 can be written into the pixel row 2 first.

According to the manner of FIG. 1, subsequently the data row 2 will be written into to cover the previously-written data row 1 through a same charging duration.

Due to adjustments on the TP signal in FIG. 2, the second falling edge of the TP signal corresponds to a position of 3H2 of the high-electric-level period of the first period of the clock signal 2, thus the data row 2 can be then written, but with a charging duration of merely H2.

In other words, for the pixel row 2, a mixed charging manner can be adopted. Specifically, the charging duration of the pixel row 2 includes a charging duration of 2H2 for the data row 1 a charging duration of H2 for the data row 2, that is, the pixel row 2 is charged by mixing the data row 1 and the data row 2.

Specifically, data of the data row 2 cannot fully cover the data row 1, so the data row 1 and the data row 2 can be mixed to be displayed by the pixel row 2.

For a pixel row 3, a similar manner as the pixel row 1 can be directly adopted. The second falling edge of the TP signal corresponds to a position of 2H2 of a high-electric-level period of a first period of a clock signal 3, thus the data row 2 can be fully written.

Therefore, in the method provided in the embodiments of the present disclosure, when the refresh rate of the panel is increased, by adjusting the start moment and the period of the input latch signal, the theoretical charging duration of a signal pixel row in the panel can be increased, so that the theoretical charging duration of the single pixel row in the panel is no less than the theoretical charging duration H1 of the corresponding single pixel row before the refresh rate of the panel is increased.

Correspondingly, single rows of the image data can be directly written into some pixel rows in the panel, and for some pixel rows, a mixed charging manner needs to be adopted to write mixed rows of the image data into some pixel rows.

In addition, based on the above analysis in FIG. 2, it is determined that an odd pixel row can display a complete single row of pixel values of the image data, and an even pixel row can display mixed two rows of pixel values of the image data.

Optionally, an even pixel row can display a complete single row of pixel values of the image data, and an odd pixel row can display mixed two rows of pixel values of the image data.

Figure 3:
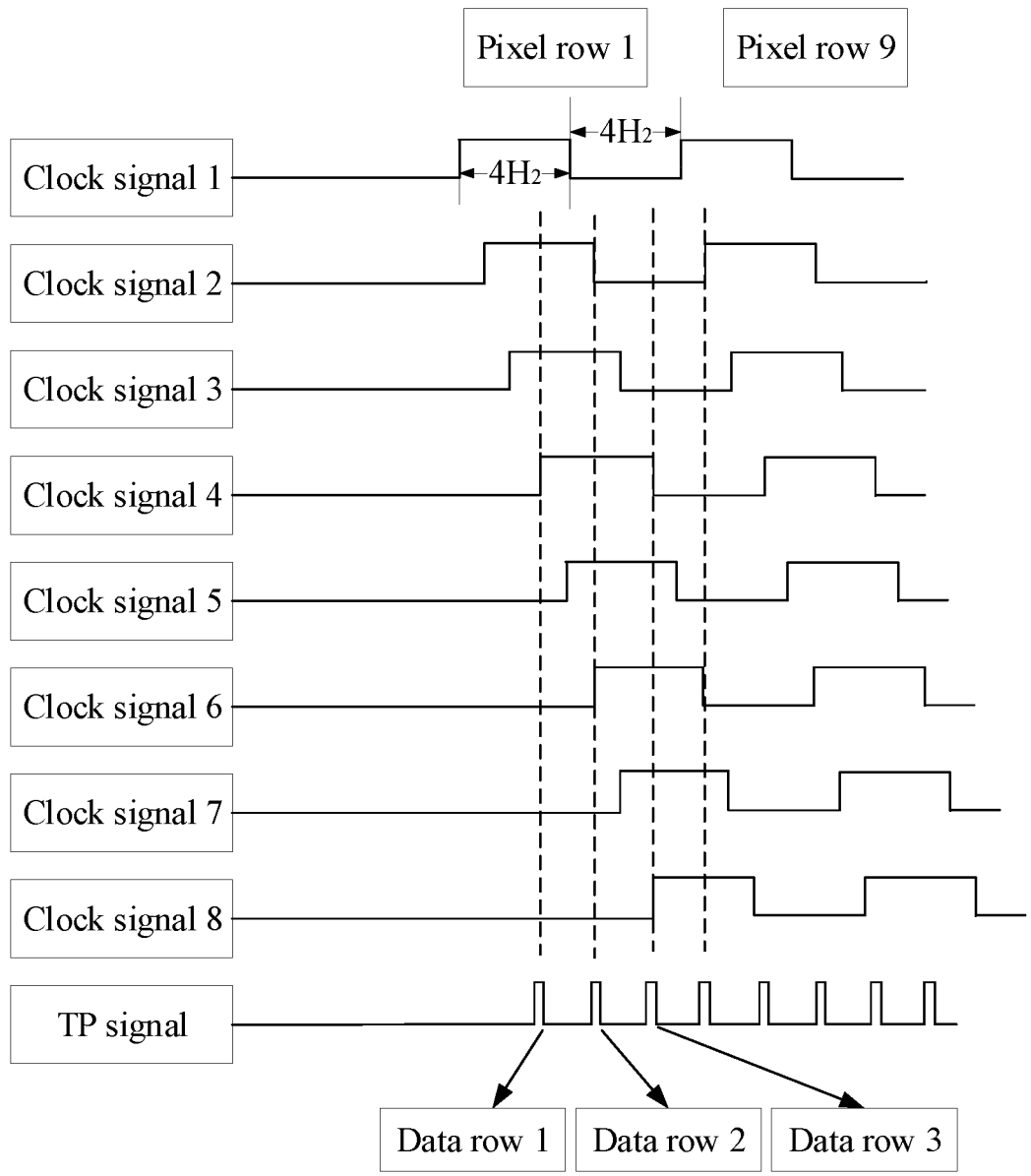
FIG. 3 shows a schematic principle diagram of another signal timing sequence of a panel according to an embodiment of the present disclosure.

To facilitate understanding, as shown in FIG. 3, FIG. 3 shows a schematic principle diagram of another signal timing sequence of a panel according to an embodiment of the present disclosure.

Specific illustration can be referred to the above analysis in FIG. 2. Based on a covering mechanism, pixel row 3 can display mixed pixel values through mixed charging of the data row 1 and the data row 2.

According to the above method, when the refresh rate of the panel is increased, by adjusting a start moment and a period of the input latch signal, a theoretical charging duration of a single pixel row of a panel with increased refresh rate can be increased, and the display effect of the panel can be improved.

Correspondingly, when the refresh rate configuration of the panel is high, by adjusting a start moment and a period of the input latch signal, a theoretical charging duration of a single pixel row of a panel with a high refresh rate can be increased, and the display effect of the panel can be improved.

Figure 4:
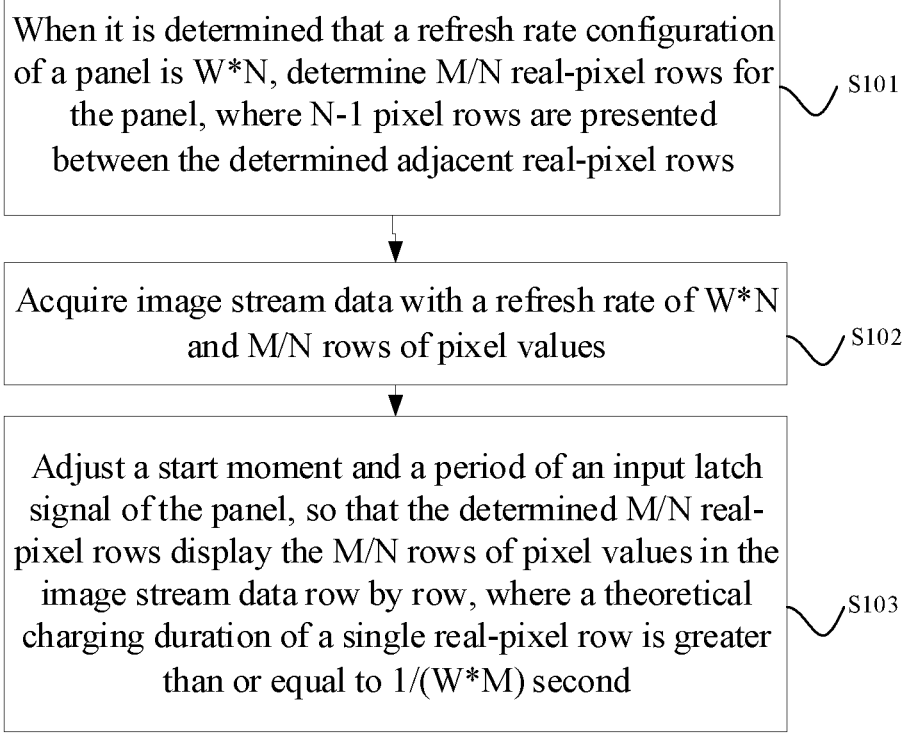
FIG. 4 shows a schematic flow chart of a panel display method according to an embodiment of the present disclosure.

As shown in FIG. 4, FIG. 4 shows a schematic flow chart of a panel display method according to an embodiment of the present disclosure.

An executive subject of the method flow is not limited. Optionally, the executive subject may be a panel, or may be a controller or a driver of the panel.

The method flow may include the following steps.

S101: when it is determined that a refresh rate configuration of a panel is W*N, M/N real-pixel rows are determined for the panel, where N−1 pixel rows are presented between adjacent real-pixel rows of the determined M/N real-pixel rows.

Optionally, the panel includes M pixel rows, and a resolution of the panel is M*Z; N≥2.

S102: image stream data with a refresh rate of W*N and M/N rows of pixel values is acquired.

Optionally, an image resolution of the image stream data may be (M/N)*Z.

S103: a start moment and a period of an input latch signal of the panel are adjusted, so that the determined M/N real-pixel rows display the M/N rows of pixel values in the image stream data row by row, where a theoretical charging duration of a single real-pixel row is greater than or equal to 1/(W*M) second.

According to the method flow, by adjusting a start moment and a period of the input latch signal, a theoretical charging duration of a single pixel row of a panel with a high refresh rate can be increased, and the display effect of the panel can be improved.

The above method flow will be described in detail below.

First, S101: when it is determined that a refresh rate configuration of a panel is W*N, M/N real-pixel rows are determined for the panel, where N−1 pixel rows are presented between adjacent real-pixel rows of the determined M/N real-pixel rows.

Optionally, the panel includes M pixel rows, and a resolution of the panel is M*Z; N≥2.

Optionally, N≥2 and N is an integer. Multiplied-frequency display of the panel can thus be achieved.

Optionally, the panel may have an upper limit of the refresh rate configuration, so W*N may be less than or equal to the upper limit of the refresh rate configuration of the panel.

Optionally, the panel may include M pixel rows, and a resolution of the panel may be M*Z.

In an optional embodiment, the resolution of the panel may be M*Z, where M represents M pixel rows of the panel, and Z represents a number of pixels in a single pixel row of the panel. For example, the resolution of the panel may be 2160*1080.

Optionally, based on the refresh rate and total number of pixel rows of the panel, a theoretical charging duration of a single pixel row of the panel can be calculated.

Optionally, determining that the refresh rate configuration of the panel is W*N may include any one of the following: determining that the refresh rate configuration of the panel needs to be updated as W*N: determining that the refresh rate configuration of the panel needs to be set as W*N: determining that the refresh rate configuration of the panel needs to be increased from W to W*N.

Corresponding to the high refresh rate configuration of the panel, based on the above analysis of FIG. 2, by adjusting the start moment and the period of the input latch signal of the panel, the theoretical charging duration of a single pixel row can be increased, so as to determine that some pixel rows in the panel each can fully display a single row of the image data, and some pixel rows each can display multiple rows of the image data in a mixed manner.

Optionally, M may be integer multiples of N, so that integral real-pixel rows can be determined for the panel.

The method flow does not limit the manner for determining M/N real-pixel rows for the panel, as long as N−1 pixel rows are presented between adjacent real-pixel rows of the determined M/N real-pixel rows.

It is to ensure that, during the high-electric-level period of the clock signal corresponding to the real pixel row, from the last falling edge of the TP signal to the falling edge of the corresponding period of the clock signal, the corresponding theoretical charging duration may be greater than or equal to 1/(W*M) second.

Optionally, it can be first determined that a first pixel row in the panel is a real-pixel row, and then pixel rows are traversed downward to determine a real-pixel row every N−1 pixel rows.

Optionally, it can be first determined that a second pixel row in the panel is a real-pixel row, and then pixel rows are traversed downward to determine a real-pixel row every N−1 pixel rows.

Second, S102: image stream data with a refresh rate of W*N and M/N rows of pixel values is acquired.

Optionally, an image resolution of the image stream data is (M/N)*Z.

Optionally, the image stream data may include data of multiple images, and the refresh rate may represent that the number of images needs to be displayed within a second. The resolution of different images in the image stream data may be same.

Optionally, the panel may adjust its own refresh rate configuration, so as to acquire the image stream data with the refresh rate of W*N for displaying.

Since the determined M/N real-pixel rows of the panel each can display a complete single row of image data, the image stream data with M/N rows of pixel values can be acquired for displaying.

Optionally, the image resolution of the image stream data needs to be adapted to the panel, thus the image resolution of the image stream data is (M/N)*Z. (M/N) represents a total number of rows of pixel values of images in the image stream data, and Z represents a number of pixel values in a single row of pixel values of the images in the image stream data, and specifically Z may be same as the number of pixels in a single pixel row of the panel.

The method flow does not limit a source for acquiring the image stream data.

Optionally, the panel can acquire the image stream data through a configured resolution adjuster.

Optionally, acquiring the image stream data with the refresh rate of W*N and the M/N rows of pixel values includes: acquiring the image stream data with the refresh rate of W*N and the M/N rows of pixel values output by a resolution adjuster.

The resolution adjuster may specifically be a Scalar unit. The resolution adjuster may be configured to adjust resolution of the image stream data, and output adjusted image stream data to the panel.

Optionally, the resolution adjuster may specifically acquire the image stream data from a graphics card, and the graphics card may be configured to generate the image stream data for displaying on the panel.

Optionally, the resolution adjuster may be configured to acquire initial image stream data with a refresh rate of W*N output by the graphics card, and adjust an image resolution of the initial image stream data to (M/N)*Z, and output an adjusted result.

In an optional embodiment, since the graphics card needs to generate the initial image stream data, when the refresh rate is W, the graphics card needs to generate an image stream data quantity W*M*Z every second. The resolution adjuster may not need to adjust the resolution, and can directly send the generated image stream data to the panel for displaying.

After the refresh rate is increased, in order not to increase burden of generating the image stream data by the graphics card, optionally, the image resolution of the initial image stream data may be smaller than or equal to (M/N)*Z.

When the refresh rate is W*N, the graphics card can generate the image stream data with the resolution of (M/N)*Z, and the graphics card needs to generate an image stream data quantity (W*N)*(M/N)*Z, that is, W*M*Z every second.

Therefore, the embodiment can increase the refresh rate of the panel without increasing computing burden of the graphics card.

Optionally, for the initial image stream data output by the graphics card, the resolution adjuster can adjust the resolution of the initial image stream data to be adapted to the resolution required by the current panel, that is, (M/N)*Z. The embodiment does not limit the specific adjusting manner of the resolution.

In an optional embodiment, when the panel has a high refresh rate configuration, the method flow is used to increase the theoretical charging duration of a single pixel row, since the start moment and the period of the input latch signal of the panel need to be adjusted, an adjusting strategy and an output situation of the resolution adjuster need to be adjusted, and the refresh rate of the image stream data output by the graphics card can also be adjusted.

Therefore, optionally, configurations of the panel, the resolution adjuster and the graphics card can be updated through a manner of power-down restarting.

Optionally, when determining that the refresh rate configuration of the panel is W*N, power-down restarting can be performed for the panel and the resolution adjuster, such that the refresh rate configuration of the panel is updated to W*N, and an output of the resolution adjuster is updated to the image stream data with the refresh rate of W*N and the M/N rows of pixel values.

In addition, an output of the graphics card can also be updated to the image stream data with the refresh rate of W*N.

The embodiment does not limit an executive subject for updating configurations. Optionally, the executive subject may be the panel, or a controller of the panel, specifically the resolution adjuster configured for the panel.

The embodiment does not limit an executive subject for controlling power-down restarting. Optionally, the executive subject may be the panel, or a controller of the panel, specifically the resolution adjuster configured for the panel.

Third, S103: a start moment and a period of an input latch signal of the panel are adjusted, so that the determined M/N real-pixel rows display the M/N rows of pixel values in the image stream data row by row, where a theoretical charging duration of a single real-pixel row is greater than or equal to 1/(W*M) second.

The method flow does not limit an adjusting manner of the input latch signal, as long as the determined M/N real-pixel rows display the M/N rows of pixel values in the image stream data row by row, and a theoretical charging duration of a single real-pixel row is greater than or equal to 1/(W*M) second.

Optionally, by taking FIG. 2 as an example, the start moment of the TP signal can be adjusted to be at a position of 2H2 of the high-electric-level period of the first period of the clock signal 1, and the period of the TP signal can be adjusted to H1.

It is to be noted that, in the manner of FIG. 1, the period of the TP signal is usually the theoretical charging duration of the single pixel row. When the refresh rate is doubled, according to the manner of FIG. 1, the period of the TP signal may be H2. After the adjustments in FIG. 2, the period of the TP signal is maintained as H1.

Based on the above analysis of FIG. 2, by adjusting the start moment and the period of the input latch signal of the panel, the determined M/N real-pixel rows can display the M/N rows of pixel values in the image stream data.

The theoretical charging duration of a real-pixel row can be ensured to be greater than or equal to H1, that is, 1/(W*M) second.

Correspondingly, other pixel rows of the panel between adjacent real-pixel rows can be described as mixed-pixel rows.

Optionally, by using two rows of pixel values displayed in the adjacent real-pixel rows and based on a non-complete covering manner, the two rows of pixel values can be mixed.

Optionally, for a mixed-pixel row between a pair of adjacent real-pixel rows of the panel, a single row of mixed-pixel values is acquired based on two rows of pixel values displayed in the pair of adjacent real-pixel rows, so that the mixed-pixel row displays the acquired single row of mixed-pixel values.

Optionally, acquiring the single row of mixed-pixel values based on the two rows of pixel values displayed in the pair of adjacent real-pixel rows may specifically include that: at least two falling edges of the TP signal are presented during the high-electric-level period of the clock signal corresponding to the mixed-pixel row, and the image data written at the previous falling edge of the TP signal can be partially covered by the image data written at the next falling edge of the TP signal, so as to obtain a covered result.

Usually, the image data written at the last falling edge of the TP signal cannot fully cover the image data written at the previous falling edge of the TP signal, thus mixing of the two rows of image data can be achieved, so as to obtain the single row of mixed pixel values based on the two rows of pixel values displayed in the pair of adjacent real-pixel rows.

The analysis of FIG. 2 can be specifically referred to.

It is to be noted that, before the refresh rate is increased, since a single row of image data needs to be completely written into each row of the panel, a determining manner of the theoretical charging duration of a single pixel row may be based on the last falling edge of the TP signal during the high-electric-level period of the clock signal corresponding to the single pixel row.

After the refresh rate is increased, since the above method flow is adopted, not a single row of image data but multiple rows of image data are written into the mixed-pixel row, and the multiple rows of image data are mixed by using the mixing mechanism. Thus, the theoretical charging duration of the mixed-pixel row may not be determined based on the above manner.

Optionally, for a mixed-pixel row, since multiple rows of image data need to be mixed by using the covering mechanism, the theoretical charging duration may be within the high-electric-level period of the clock signal corresponding to the single pixel row, starting from the first falling edge of the TP signal, and ending at the falling edge of the period of the clock signal.

Optionally, for a mixed-pixel row, since what is written into is pixel values after the two rows of image data are mixed, the theoretical charging duration of the single mixed-pixel row may be greater than or equal to 1/(W*M) second.

For example, the theoretical charging duration of pixel row 2 in FIG. 2 may be considered as starting from the first falling edge of the TP signal and ending at the falling edge of the first period of the clock signal 2, that is, 3H2.

In the embodiment, for the real-pixel rows and mixed-pixel rows of the panel, the single row of image data is written into the real-pixel row, and for the mixed-pixel row, multiple rows of pixel values in the image data can be mixed by using the covering mechanism through a mixed charging manner, and a transition effect of image display between two real-pixel rows adjacent to the mixed-pixel row is improved, thereby improving the display effect of the panel.

Optionally, for each mixed-pixel row between each pair of adjacent real-pixel rows of the panel, a single row of mixed-pixel values are acquired based on two rows of pixel values displayed in each pair of adjacent real-pixel rows, so that the mixed-pixel row displays the acquired single row of mixed-pixel values.

Optionally, single rows of mixed-pixel values displayed by different mixed-pixel rows may be different. For different mixed-pixel rows between a pair of adjacent real-pixel rows, displayed single rows of mixed-pixel values may be different.

Certainly, the method flow does not specifically limit displaying manner of the mixed-pixel rows. Optionally, the mixed-pixel row can be controlled by a program to display same image data as any one of adjacent real-pixel rows: or the mixed-pixel row can be controlled by a program so that some pixels in the mixed-pixel row display same image data as any one of adjacent real-pixel rows, and other pixels in the mixed-pixel row display same image data as another adjacent real-pixel row. The image data may specifically include pixel values in the image.

For ease of understanding, an embodiment of another panel display method is provided by embodiments of the present disclosure.

Figure 5:
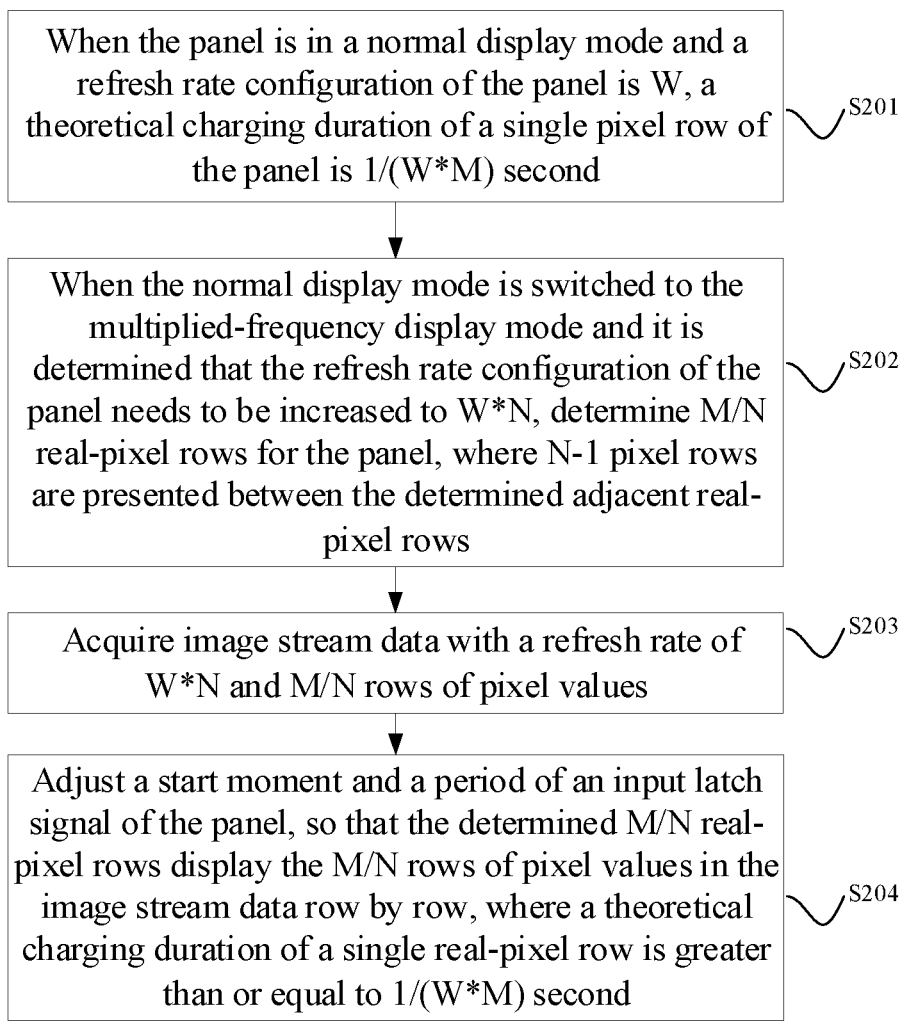
FIG. 5 shows a schematic flow chart of another panel display method according to an embodiment of the present disclosure.

As shown in FIG. 5, FIG. 5 shows a schematic flow chart of another panel display method according to an embodiment of the present disclosure.

An executive subject of the method flow is not limited. Optionally, the executive subject may be a panel, or may be a controller of the panel.

Optionally, the panel includes a normal display mode and a multiplied-frequency display mode that can be switched to each other.

The method flow may include the following steps.

S201: when the panel is in a normal display mode and a refresh rate configuration of the panel is W, a theoretical charging duration of a single pixel row of the panel is 1/(W*M) second.

Optionally, the panel may include M pixel rows, and a resolution of the panel may be M*Z.

S202: when the normal display mode is switched to the multiplied-frequency display mode and it is determined that the refresh rate configuration of the panel needs to be increased to W*N, M/N real-pixel rows are determined for the panel, where N−1 pixel rows are presented between adjacent real-pixel rows of the determined M/N real-pixel rows. Optionally, N≥2.

S203: image stream data with a refresh rate of W*N and M/N rows of pixel values is acquired.

Optionally, an image resolution of the image stream data is (M/N)*Z.

S204: a start moment and a period of an input latch signal of the panel are adjusted, so that the determined M/N real-pixel rows display the M/N rows of pixel values in the image stream data row by row, where a theoretical charging duration of a single real-pixel row is greater than or equal to 1/(W*M) second.

According to the embodiment of the method, through the normal display mode and the multiplied-frequency display mode on the panel that can be switched to each other, multiplied-frequency display can be achieved to increase the refresh rate of the panel, so as to improve the display effect of the panel, and increase the theoretical charging duration of the single pixel row of the panel after the refresh rate is increased.

The specific description of the method of the embodiment can be referred to the description of the above method flow S101-S103.

For the above method embodiments, an embodiment of the present disclosure further provides an apparatus embodiment.

Figure 6:
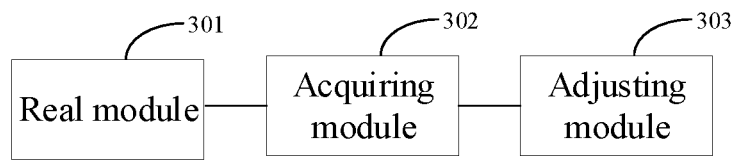
FIG. 6 shows a schematic structural diagram of a panel display apparatus according to an embodiment of the present disclosure.

As shown in FIG. 6, FIG. 6 shows a schematic structural diagram of a panel display apparatus according to an embodiment of the present disclosure.

A device where the apparatus is applied to is not limited. Optionally, the apparatus may be applied to a panel, or may be applied to a controller of the panel.

The apparatus may include the following modules.

A real module 301 is configured to, when determining that a refresh rate configuration of a panel is W*N, determine M/N real-pixel rows for the panel, where N−1 pixel rows are presented between adjacent real-pixel rows of the determined M/N real-pixel rows.

Optionally, the panel may include M pixel rows, and a resolution of the panel may be M*Z: N≥2.

An acquiring module 302 is configured to acquire image stream data with a refresh rate of W*N and M/N rows of pixel values. Optionally, an image resolution of the image stream data is (M/N)*Z.

An adjusting module 303 is configured to adjust a start moment and a period of an input latch signal of the panel, so that the determined M/N real-pixel rows display the M/N rows of pixel values in the image stream data row by row, where a theoretical charging duration of a single real-pixel row is greater than or equal to 1/(W*M) second.

Optionally, determining that the refresh rate configuration of the panel is W*N includes any one of the following: determining that the refresh rate configuration of the panel needs to be updated as W*N: determining that the refresh rate configuration of the panel needs to be set as W*N: determining that the refresh rate configuration of the panel needs to be increased from W to W*N.

Optionally, the adjusting module 303 is further configured to:
for a mixed-pixel row between a pair of adjacent real-pixel rows of the panel, acquire a single row of mixed-pixel values based on two rows of pixel values displayed in the pair of adjacent real-pixel rows, so that the mixed-pixel row displays the acquired single row of mixed-pixel values.

Optionally, the acquiring module 302 is configured to:
acquire the image stream data with the refresh rate of W*N and the M/N rows of pixel values output by a resolution adjuster;
the resolution adjuster is configured to acquire initial image stream data with a refresh rate of W*N output by a graphics card, adjust an image resolution of the initial image stream data to (M/N)*Z, and output an adjusted result.

Optionally, the image resolution of the initial image stream data is smaller than or equal to (M/N)*Z.

Optionally, the real module 301 is further configured to: when determining that the refresh rate configuration of the panel is W*N, perform power-down restarting for the panel and the resolution adjuster, to update the refresh rate configuration of the panel to W*N, update an output of the resolution adjuster to the image stream data with the refresh rate of W*N and the M/N rows of pixel values; and update an output of the graphics card to the image stream data with the refresh rate of W*N.

Specific illustration can be referred to from the above method embodiments.

For the above method embodiments, an embodiment of the present disclosure further provides a system embodiment.

Figure 7:
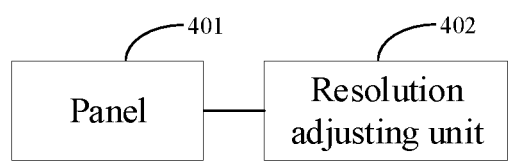
FIG. 7 shows a schematic structural diagram of a panel display apparatus according to an embodiment of the present disclosure.

As shown in FIG. 7, FIG. 7 shows a schematic structural diagram of a panel display system according to an embodiment of the present disclosure.

The system may include: a panel 401 and a resolution adjuster 402.

The panel 401 is configured to, when determining that a refresh rate configuration of the panel 401 is W*N, determine M/N real-pixel rows for the panel 401, where N−1 pixel rows are presented between adjacent real-pixel rows of the determined M/N real-pixel rows.

Optionally, the panel 401 may include M pixel rows, and a resolution of the panel 401 may be M*Z: N≥2.

Acquire image stream data with a refresh rate of W*N and M/N rows of pixel values output by the resolution adjuster 402: where an image resolution of the image stream data is (M/N)*Z.

Adjust a start moment and a period of an input latch signal of the panel 401, so that the determined M/N real-pixel rows display the M/N rows of pixel values in the image stream data row by row, where a theoretical charging duration of a single real-pixel row is greater than or equal to 1/(W*M) second.

The resolution adjuster 402 is configured to acquire initial image stream data with a refresh rate of W*N output by the graphics card, adjust an image resolution of the initial image stream data to (M/N)*Z, and output an adjusted result.

Optionally, the resolution adjuster 402 is configured to: when determining that the refresh rate configuration of the panel 401 is W*N, perform power-down restarting for the resolution adjuster 402, to update an output of the resolution adjuster 402 to the image stream data with the refresh rate of W*N and the M/N rows of pixel values; and update an output of the graphics card to the image stream data with the refresh rate of W*N.

Optionally, the panel 401 may be configured to, when it is determined that the refresh rate needs to be increased to W*N, perform power-down restarting for the panel 401, to update the refresh rate of the panel 401 to W*N.

Optionally, the resolution adjuster 402 may be configured to: when it is determined that the refresh rate needs to be increased to W*N, perform power-down restarting for the panel 401, and update the refresh rate configuration of the panel 401 to W*N.

Optionally, the system may further include: a graphics card 403: the graphics card 403 may be configured to output initial image stream data with the refresh rate of W*N; where the image resolution of the initial image stream data is smaller than or equal to (M/N)*Z.

Optionally, the panel 401 may be configured to: for any mixed-pixel row between any pair of adjacent real-pixel rows of the panel 401, acquire a single row of mixed-pixel values based on two rows of pixel values displayed in the pair of adjacent real-pixel rows, so that the mixed-pixel row displays the acquired single row of mixed-pixel values.

Specific illustration can be referred to from the above method embodiments.

The embodiment of the present disclosure also provides a computer device, at least including a memory, a processor and a computer program stored in the memory and executable by the processor, where the processor performs any of the above method embodiments when executing the program.

The embodiment of the present disclosure also provides an electronic device, including: at least one processor; and a memory communicatively connected with the at least one processor: where the memory stores an instruction executable by the at least one processor, and the instruction is executed by the at least one processor to cause the at least one processor to perform any of the above method embodiments.

Figure 8:
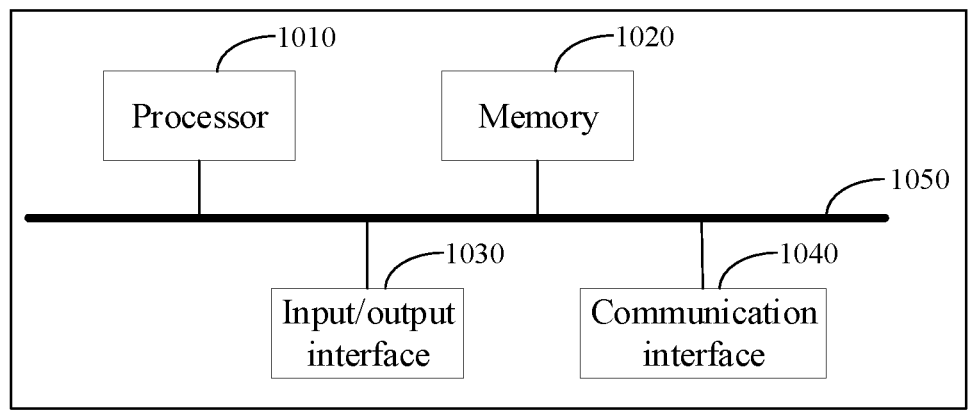
FIG. 8 shows a schematic structural diagram of a computer device hardware for configuring method of embodiments of the present disclosure according to an embodiment of the present disclosure.

FIG. 8 shows a schematic structural diagram of a computer device hardware for configuring method of embodiments of the present disclosure according to an embodiment of the present disclosure. The device may include: a processor 1010, a memory 1020, an input/output interface 1030, a communication interface 1040 and a bus 1050. The processor 1010, the memory 1020, the input/output interface 1030 and the communication interface 1040 are connected to each other through the bus 1050.

The processor 1010 can be implemented by a general CPU (Central Processor), a micro-processor, an application specific integrated circuit (ASIC), or one or more integrated circuits, etc. And the processor 1010 is used for executing related programs to implement the technical solution provided by the embodiments of the present disclosure.

The memory 1020 can be implemented in the form of a ROM (Read Only Memory), a RAM (Random Access Memory), a static storage device, a dynamic storage device, etc. The memory 1020 can store an operating system and other application programs. When the technical solution provided by the embodiments of the present disclosure is implemented by software or firmware, the relevant program codes are stored in the memory 1020 and are called and executed by the processor 1010.

The input/output interface 1030 is used to connect input/output modules to realize information input and output. The input/output modules can be configured as components in the device (not shown in the figure) or can be externally connected to the device to provide corresponding functions. Input devices may include keyboards, mice, touch screens, microphones, various sensors, etc., and output devices may include displays, speakers, vibrators, indicator lights, etc.

The communication interface 1040 is used to connect a communication module (not shown in the figure) to realize communication interaction between the device and other devices. The communication module can communicate by wired means (such as USB, network cable, etc.) or wireless means (such as mobile network, WIFI, Bluetooth, etc.).

The bus 1050 includes a path to transfer information between various components of the device, such as the processor 1010, the memory 1020, the input/output interface 1030 and the communication interface 1040.

It should be noted that although the above device only shows the processor 1010, the memory 1020, the input/output interface 1030, the communication interface 1040 and the bus 1050, in the specific implementation process, the device may also include other components necessary for normal operation. In addition, it can be understood by those skilled in the art that the above-mentioned device may also include only the components necessary to realize the embodiment solution of the present disclosure, and it is not necessary to include all the components shown in the figure.

Embodiments of the present disclosure also provide a computer-readable storage medium, on which a computer program is stored, and when the computer program is executed by a processor, any of the above method embodiments is implemented.

Embodiments of the present disclosure also provide a computer-readable storage medium storing a computer program, and when the computer program is executed by a processor, any of the above method embodiments is implemented.

The computer-readable medium includes permanent and non-permanent, movable and non-movable media, and can store information by any manner or technology. Information can be computer-readable instructions, data structures, modules of programs or other data. Examples of the computer storage medium include, but not limited to, a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, CD-ROM, a digital versatile disc (DVD) or other optical storage, and a magnetic cassette tape, a magnetic disk storage or other magnetic storage, or any other non transmission medium, can be used to store information that can be accessed by computing devices. According to the definition herein, the computer-readable medium does not include transitory computer-readable medium (transitory media), such as modulated data signals and carrier waves.

From the description of the above embodiments, those skilled in the art can clearly understand that the embodiments of the present disclosure can be realized by means of software and necessary general hardware platforms. Based on such understanding, the technical solution of the embodiments of the present disclosure can be embodied in the form of a software product that can be stored in a storage medium, such as ROM/RAM, magnetic disk, optical disk, etc., and includes several instructions to cause a computer device (which may be a personal computer, a server, or a network device, etc.) execute the methods described in various embodiments or some parts of the embodiments of the present disclosure.

The systems, apparatuses, modules or units set forth in the above embodiments can be realized by computer chips or entities, or by products with certain functions. A typical implementation device is a computer, and a specific form of the computer can be a personal computer, a laptop computer, a cellular phone, a camera phone, a smart phone, a personal digital assistant, a media player, a navigation device, an email transceiver, a game console, a tablet computer, a wearable device or a combination of any of these devices.

Each embodiment in the specification is described in a progressive way, and only same and similar parts between the embodiments can be referred to each other, and each embodiment focuses on differences from other embodiments. Especially, for the apparatus embodiments, since the apparatus embodiments are basically similar to the method embodiments, the description is relatively simple, and the relevant points can only be found in part of the description of the method embodiments. The apparatus embodiments described above are only schematic, where modules described as separate components may or may not be physically separated, and functions of each module can be realized in a same software and/or hardware when implementing the embodiment solution of the present disclosure. Some or all of the modules can also be selected according to actual needs to achieve the purpose of the embodiment. Those of ordinary skills in the art can understand and implement without making creative efforts.

The above-described contents are only specific implementations of embodiments of the present disclosure. It should be noted that for those of ordinary skills in the art, several improvements and embellishments can be made without departing from the principle of the embodiment of the present disclosure, and these improvements and embellishments should also be regarded as the protection of the embodiments of the present disclosure.

In the present disclosure, the terms "first" and "second" are only used for descriptive purposes and cannot be understood as indicating or implying relative importance. The term "multiple" refers to two or more, unless otherwise clearly defined.

Other embodiments of the present disclosure will be readily apparent to those of ordinary skills in the art after considering the specification and practicing the disclosure disclosed herein. The present disclosure is intended to cover any variation, use or adaptation of the present disclosure, and such variation, use and adaptation follow the general principle of the present disclosure and include common knowledge or common technical solutions in the technical field that are not disclosed in the present disclosure. The specification and embodiments are to be regarded as illustrative only, with the true scope and spirit of the disclosure being indicated by the following claims.

It should be understood that the present disclosure is not limited to the precise structure described above and shown in the drawings, and various modifications and changes can be made without departing from its scope. The scope of the present disclosure is limited only by the appended claims.

The invention claimed is:

1. A panel display method, comprising:
when determining that a refresh rate configuration of a panel is W*N, determining M/N real-pixel rows for the panel, wherein N−1 pixel rows are presented between adjacent real-pixel rows of the determined M/N real-pixel rows; wherein the panel comprises M pixel rows, and a resolution of the panel is M*Z; N≥2;
acquiring image stream data with a refresh rate of W*N and M/N rows of pixel values; wherein an image resolution of the image stream data is (M/N)*Z; and
adjusting a start moment and a period of an input latch signal of the panel, so that the determined M/N real-pixel rows display the M/N rows of pixel values in the image stream data row by row, wherein a theoretical charging duration of a single real-pixel row is greater than or equal to 1/(W*M) second;
wherein the W represents a current refresh rate of the panel, the M represents a total number of pixel rows of the pane, and the Z represents a number of pixels in a single pixel row of the panel.

2. The method according to claim 1, wherein determining that the refresh rate configuration of the panel is W*N comprising any one of:
determining that the refresh rate configuration of the panel needs to be updated as W*N;
determining that the refresh rate configuration of the panel needs to be set as W*N; and
determining that the refresh rate configuration of the panel needs to be increased from W to W*N.

3. The method according to claim 1, further comprising:
for a mixed-pixel row between a pair of adjacent real-pixel rows of the panel, acquiring a single row of mixed-pixel values based on two rows of pixel values displayed in the pair of adjacent real-pixel rows, so that the mixed-pixel row displays the acquired single row of mixed-pixel values.

4. The method according to claim 1, wherein acquiring the image stream data with the refresh rate of W*N and the M/N rows of pixel values comprises:
acquiring the image stream data with the refresh rate of W*N and the M/N rows of pixel values output by a resolution adjuster;
the resolution adjuster is configured to acquire initial image stream data with a refresh rate of W*N output by a graphics card, adjust an image resolution of the initial image stream data to (M/N)*Z, and output an adjusted result.

5. The method according to claim 4, wherein the image resolution of the initial image stream data is smaller than or equal to (M/N)*Z.

6. The method according to claim 4, wherein when determining that the refresh rate configuration of the panel is W*N, the method further comprises:
performing power-down restarting for the panel and the resolution adjuster, to update the refresh rate configuration of the panel to W*N, update an output of the resolution adjuster to the image stream data with the refresh rate of W*N and the M/N rows of pixel values; and update an output of the graphics card to the image stream data with the refresh rate of W*N.

7. An electronic device, comprising:
at least one processor; and
a memory communicatively connected to the at least one processor; wherein
the memory stores an instruction executable by the at least one processor, and the instruction is executed by the at least one processor to cause the at least one processor to perform the method according to claim 1.

8. A non-transitory computer-readable storage medium storing a computer program, wherein the computer program is executed by the processor to implement the method according to claim 1.

9. A panel display method, wherein a panel comprises a normal display mode and a multiplied-frequency display mode, and the normal display mode and the multiplied-frequency display mode are capable of being switched to each other;
the method comprises:
when the panel is in the normal display mode and a refresh rate configuration of the panel is W, determining that a theoretical charging duration of a single pixel row of the panel is 1/(W*M) second; the panel comprises M pixel rows, and a resolution of the panel is M*Z;
when switching from the normal display mode to the multiplied-frequency display mode and determining that the refresh rate configuration of the panel needs to be increased to W*N, determining M/N real-pixel rows for the panel, wherein N−1 pixel rows are presented between adjacent real-pixel rows of the determined M/N real-pixel rows; N≥2;
acquiring image stream data with a refresh rate of W*N and M/N rows of pixel values; wherein an image resolution of the image stream data is (M/N)*Z; and
adjusting a start moment and a period of an input latch signal of the panel, so that the determined M/N real-pixel rows display the M/N rows of pixel values in the image stream data row by row, wherein a theoretical charging duration of a single real-pixel row is greater than or equal to 1/(W*M) second;
wherein the W represents a current refresh rate of the panel, the M represents a total number of pixel rows of the pane, and the Z represents a number of pixels in a single pixel row of the panel.

10. A panel display system, comprising a panel and a resolution adjuster;
the panel is configured to:
when determining that a refresh rate configuration of the panel is W*N, determine M/N real-pixel rows for the panel, wherein N−1 pixel rows are presented between adjacent real-pixel rows of the determined M/N real-pixel rows; wherein the panel comprises M pixel rows, and a resolution of the panel is M*Z; N≥2; acquire image stream data with a refresh rate of W*N and M/N rows of pixel values output by the resolution adjuster; wherein an image resolution of the image stream data is (M/N)*Z; and adjust a start moment and a period of an input latch signal of the panel, so that the determined M/N real-pixel rows display the M/N rows of pixel values in the image stream data row by row, wherein a theoretical charging duration of a single real-pixel row is greater than or equal to 1/(W*M) second;
the resolution adjuster is configured to acquire initial image stream data with a refresh rate of W*N output by a graphics card, adjust an image resolution of the initial image stream data to (M/N)*Z, and output an adjusted result;
wherein the W represents a current refresh rate of the panel, the M represents a total number of pixel rows of the pane, and the Z represents a number of pixels in a single pixel row of the panel.

11. The system according to claim 10, wherein
the resolution adjuster is configured to: when determining that the refresh rate configuration of the panel is W*N, perform power-down restarting for the resolution adjuster, to update an output of the resolution adjuster to the image stream data with the refresh rate of W*N and the M/N rows of pixel values; and update an output of the graphics card to the image stream data with the refresh rate of W*N; and
the panel is configured to: when determining that the refresh rate configuration of the panel is W*N, perform power-down restarting for the panel, to update the refresh rate configuration of the panel to W*N.

12. The system according to claim 10, further comprising the graphics card;
the graphics card is configured to output the initial image stream data with the refresh rate of W*N; wherein the image resolution of the initial image stream data is smaller than or equal to (M/N)*Z.

* * * * *